United States Patent
Bachnak (12)

(10) Patent No.: US 6,257,075 B1
(45) Date of Patent: Jul. 10, 2001

(54) METHOD OF PRODUCING A SENSOR HAVING A ROTARY ANGLE LIMITER FOR REGISTERING A TORQUE, AND SENSOR PRODUCED IN ACCORDANCE WITH THIS METHOD

(75) Inventor: Nouhad Bachnak, Frankfurt (DE)

(73) Assignee: Mannesmann VDO AG (DE)

( * ) Notice: Subject to any disclaimer, the term of this patent is extended or adjusted under 35 U.S.C. 154(b) by 0 days.

(21) Appl. No.: 09/364,627

(22) Filed: Jul. 29, 1999

(30) Foreign Application Priority Data

Aug. 3, 1998 (DE) .............................................. 198 34 897

(51) Int. Cl.[7] ...................................................... G01L 3/02
(52) U.S. Cl. ...................................................... 73/862.322
(58) Field of Search .................... 73/862.08, 862.321, 73/862.322, 862.326, 862.325, 118.1

(56) References Cited

U.S. PATENT DOCUMENTS

| | | |
|---|---|---|
| 4,712,433 | 12/1987 | Hochstein et al. . |
| 4,805,463 * | 2/1989 | Kelledes et al. ................. 73/862.331 |
| 4,864,873 * | 9/1989 | Eto et al. ......................... 73/862.322 |
| 4,881,414 * | 11/1989 | Setaka et al. .................... 73/862.331 |
| 5,009,110 | 4/1991 | Lang et al. . |
| 5,020,616 * | 6/1991 | Yagi et al. ............................. 180/444 |

FOREIGN PATENT DOCUMENTS

| | | |
|---|---|---|
| 1245167 | 7/1967 | (DE) . |
| 3104092 | 12/1987 | (DE) . |
| 4004589 | 8/1991 | (DE) . |
| 4232994 | 10/1995 | (DE) . |

* cited by examiner

*Primary Examiner*—Max Noori
(74) *Attorney, Agent, or Firm*—Richard A. Speer; Mayer Brown & Platt

(57) ABSTRACT

In a sensor (1), firstly two sections (3, 12) of a steering shaft (4) are connected by means of a torsion rod (10) which bears a measuring cell (9). For the purpose of protection against overloading, the sensor (1) has a rotary angle limiter (7) which is formed by parting lines (5, 6) which run in the manner of a step longitudinally and transversely, in the housing (2), which is initially connected to the sections (3, 12) and the torsion rod (10). By this means, the torsion rod (10) can be rotated to a limited extent with respect to the housing (2) of the sensor (1), the rotary angle difference being determined by the width of the longitudinally extending parting line (5). As a result, the rotary angle limiter (7) is largely independent of dimensional deviations during installation and, even at low rotary angle differences, permits the exact determination of the rotary forces applied.

9 Claims, 1 Drawing Sheet

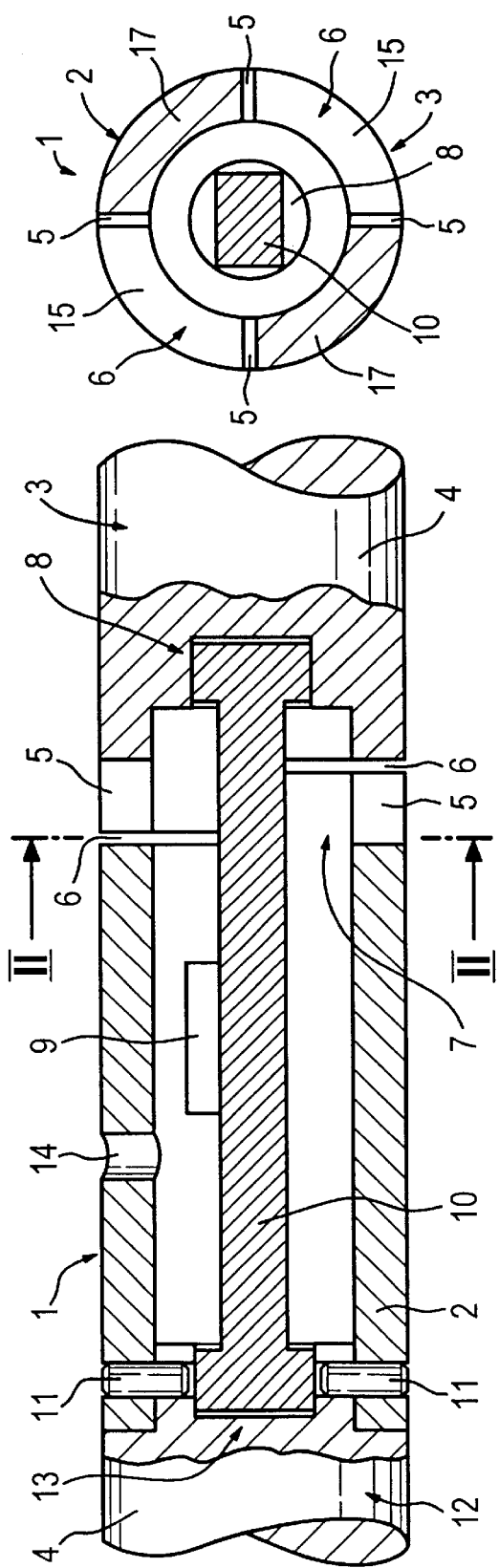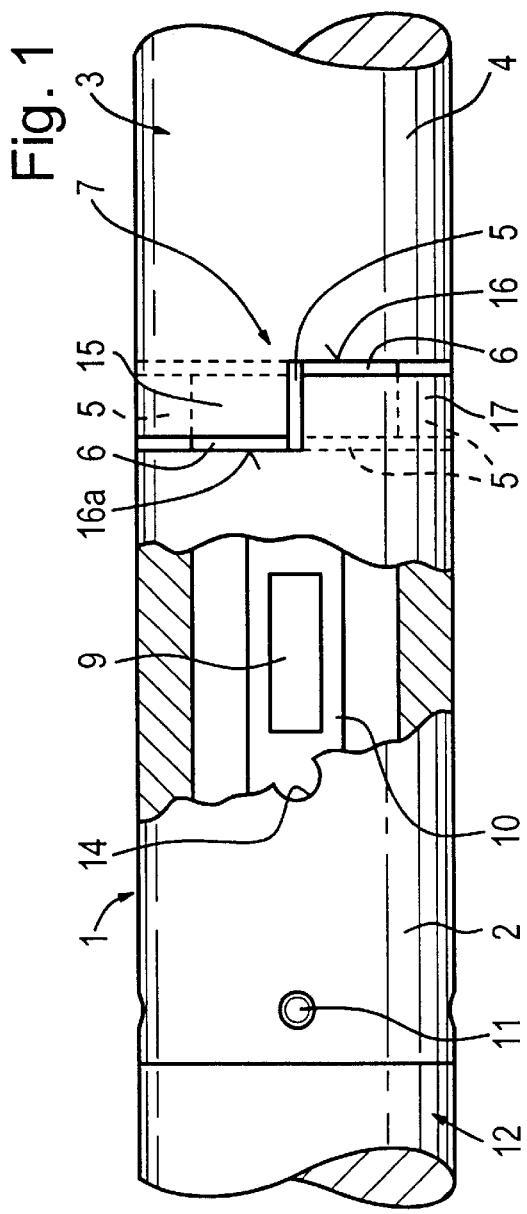
Fig. 1
Fig. 2
Fig. 3

METHOD OF PRODUCING A SENSOR HAVING A ROTARY ANGLE LIMITER FOR REGISTERING A TORQUE, AND SENSOR PRODUCED IN ACCORDANCE WITH THIS METHOD

BACKGROUND OF THE INVENTION

The invention relates to a method of producing a sensor having a housing and a measuring cell for registering a torque, in particular a torque introduced into a steering shaft of a motor vehicle, said sensor having a rotary angle limiter for limiting a rotary angle difference between the housing and the measuring cell in order to protect the sensor against overloading. Furthermore, the invention relates to a sensor produced with this method.

Such sensors are used in power-steering systems of modern motor vehicles, in order to measure the forces acting on the steering. The measured values obtained in this way are then fed as controlled variable to a control unit which calculates from them a signal for a power-steering system, preferably an electric or electrohydraulic power-steering system. In this case, the steering actuating force is initially not assisted below a predetermined torque, so that the driver has to apply the steering actuating force on his own, and feedback of the forces acting on the steering is thus made available to him. Above this threshold, the control unit ensures power assistance, and hence a constant steering actuating force, so that the steering actuating force to be applied by the driver always remains within a comfortable range. The "spongy driving feel" often criticized earlier in power-steering systems can thus be avoided.

In order to register the rotary forces, the sensor is inserted into a section of the steering shaft, so that the forces introduced into the steering shaft are transmitted by a torsion rod bearing a measuring cell. The steering force introduced therefore has the effect of producing a torsion, which is registered by the measuring cell and which, for example, is measured as strain by means of strain gauges. For reasons of safety, when such a sensor is used, a rotary angle limiter has to be provided, which limits the rotary angle difference between the two sections of the steering shaft connected by means of the sensor, so that a fault in the measuring cell, for example as a result of overloading and fracture of the torsion rod, does not lead to complete failure of the steering. In addition, the rotary angle limiter serves to protect the measuring cell against too great a deflection, which can lead to plastic deformation and hence to damage to the measuring cell. This rotary angle limiter, generally implemented as a driver, permits only a restricted rotary angle difference for this purpose, this usually being about 5°. As soon as this maximum rotary angle difference has been exceeded, the forces acting on the steering shaft are essentially transmitted by the rotary angle limiter.

The known sensors have the disadvantageous effect that the rotary angle difference has to be selected to be relatively large since, otherwise, the registration of correct measured values is not possible because of deviations in the installation of the sensor. In the case of smaller permissible rotary angle differences, in the worst case the tolerance values lead to the rotary motion being transmitted by the rotary angle limiter before registration of the measured value is possible. This relatively large maximum rotary angle difference has a disadvantageous effect on the system behavior and, under certain circumstances, can be noticed by the driver. In particular, this can result in a time-delayed system behavior, which leads to a state of uncertainty in the driver. By contrast, the exclusively electrically operating power-steering systems require, above all, rapid and accurate measured values, which cannot be ensured in the case of high permissible rotary angle differences of this type.

The invention is based on the problem of configuring a method of producing a sensor of the type mentioned at the beginning in such a way that the registration of the measured value can be performed with high accuracy even at small rotary angle differences. At the same time, production is to be simplified and the outlay on installation is to be reduced. Furthermore, a sensor produced by means of the method according to the invention is to be provided.

According to the invention, this first-mentioned problem is solved in that firstly the measuring cell and the housing are connected to form one structural unit and then the rotary angle limiter is formed, by separating the housing and the measuring cell along a predetermined parting line, in such a way that the first housing part remains connected to a first end and a second housing part remains connected to a second end of the measuring cell, and that a limited rotary angle difference between the housing parts and the measuring cell is possible. By this means, the measuring cell and the housing can initially be produced with relatively high tolerance values and connected to each other. The maximum rotary angle difference permissible by the rotary angle limiter is subsequently determined only by the configuration of the parting line, in particular its width, so that dimensional deviations of the components have no influence at all. As a result, very low rotary angle differences are sufficient for an accurate measurement, so that no delayed transmission behavior can occur. At the same time, the installation may be made considerably easier because of the higher permissible tolerance values.

The parting line could be made on the housing in such a way that when the maximum rotary angle difference is exceeded, a frictional or force-transmitting connection between the two housing parts is achieved. However, an embodiment of the invention in which the parting line is implemented so as to connect the housing parts in a form-fitting manner is particularly beneficial. As a result, the maximum rotary angle difference between the housing and the measuring cell is predetermined with high accuracy by the shaping of the parting line, the influence of wear, in particular, being unimportant. The maximum rotary angle difference may easily be set during the manufacturing process by the parting line width, which makes it easily possible to adapt to different applications.

Particularly well suited to this is a development of the method according to the invention in which the parting line for connecting the housing parts is implemented in the manner of a claw connection. In this case, at least one claw engages in a corresponding recess, so that at least one contact face is in each case formed between the claw and the recess when the maximum rotary angle difference is exceeded in one direction and in the opposite direction. The number of claws implemented in this way is in principle arbitrary, and in practice may be, for example, two.

A development of the method according to the invention is particularly advantageous if the measuring cell is connected to the housing by means of a dowel pin. This permits the structural unit made of housing and measuring cell to be produced largely without stress. The subsequent separating of the housing therefore does not lead to any change in the relative position of the components in relation to each other. This possible source of error in the registration of the measured value can be reliably avoided in this way.

Another, particularly beneficial development of the method is provided if the measuring cell and the housing are adhesively bonded to each other to form one structural unit. This refinement of the method requires only low dimensional accuracies of the individual components of the sensor. The connecting points are joined together only by means of adhesive, it being possible for the components to be held largely without stress.

One embodiment of the invention is particularly advantageous when the parting line is made on a circumferential face of the housing. This permits a compact embodiment of the sensor to be achieved, as a result of which the external dimensions of the steering are not changed. In addition, the maximum transmissible forces are changed only insignificantly by the sensor.

Another, particularly advantageous development of the method according to the invention is provided by the parting line being made on an end face of the housing. By this means, damage to the measuring cell during the separating operation is largely ruled out, since the cutting direction does not point in the direction of the measuring cell when the parting line is being made. As a result, a cutting tool which inadvertently reaches too far into the interior of the housing does not strike the measuring cell.

A development of the invention is particularly advantageous when the housing is provided with an opening through which electrical contact means for the measuring cell can be led. As a result, said means can be laid without problems in the interior of the housing, and subsequent adjustment of the measuring cell can be performed easily.

A development of the method according to the invention is particularly beneficial when the measuring cell and the housing are connected with axial play to form one structural unit. As a result, thermal expansion, for example, does not lead to any change in the measured values, such as otherwise could be produced by end-compression of the measuring cell.

Particularly simple, too, is a development of the method in which the housing is formed by sections of the steering which are to be connected to each other. In this way, the housing as a separate component is dispensed with, by the steering being provided with depressions which surround the measuring cell. It is therefore merely necessary for the measuring cell to be inserted into the depression and for the two sections of the steering to be connected to each other, which leads to a reduction in the outlay during installation.

An embodiment of the method according to the invention is particularly beneficial if the parting line is produced by water-jet or laser cutting. In this case, the desired parting line may be made in the housing with an adjustable cutting depth, so that damage to the measuring cell located underneath is ruled out. To this end, the depth of the parting line can be set with sufficient accuracy, with the result that, in particular, the making of the parting line on the circumferential face is also considerably simplified. In addition, a very narrow parting line can be produced in this way with great exactitude.

The second-mentioned problem to provide a sensor having a housing and a measuring cell for registering a torque, in particular a torque introduced into a steering shaft of a motor vehicle, said sensor having a rotary angle limiter for limiting a rotary angle difference between the housing and the measuring cell in order to protect the measuring cell against overloading, is solved according to the invention by the rotary angle limiter being formed by a parting line of predetermined width in the housing that is connected to the measuring cell to form one structural unit. The parting line is therefore independent of any tolerances which may be present during the installation of the measuring cell and of the housing. For this purpose, the parting line, which simultaneously determines the maximum rotary angle difference between measuring cell and housing by means of its width, is arranged in the housing that is connected to the measuring cell to form one structural unit. As a result, installation errors are largely ruled out, and the accuracy of the measured values registered in this way is significantly improved.

A particularly advantageous development of the invention is provided when the housing is formed by a section of the steering shaft. By this means, the sensor can be implemented to be simultaneously space-saving and simple to produce. In this case, the ability of the arrangement to be loaded is virtually unchanged by comparison with an implementation without a sensor.

DESCRIPTION OF THE DRAWINGS

The invention permits various embodiments. In order to clarify its basic principle further, one of these embodiments is illustrated in the drawing and will be described below. In the drawing:

FIG. 1 shows a lateral, partly sectioned illustration of a sensor according to the invention, FIG. 2 shows the sensor in a view sectioned along the line II—II, FIG. 3 shows the sensor rotated through 90° in a lateral, partly sectioned illustration.

DETAILED ESCRIPTION OF THE INVENTION

FIG. 1 shows a partly sectioned side view of a sensor 1. The sensor 1 has a housing 2, which is initially connected in one piece to a section 3 of a steering shaft 4, a steering wheel (not illustrated here) of a motor vehicle being connected to the section 3. In the position illustrated, the housing 2 has already been separated from the section 3 of the steering shaft 4 along parting lines 5 running longitudinally in relation to the axis of rotation and parting lines 6 running transversely thereto. For the purpose of better understanding, reference is firstly made to FIG. 3, which shows the course, formed in the manner of a claw coupling, of the parting lines 5 and 6 running at right angles to each other. By this means, in each case claws 17 of the housing 2 engage in depressions 16 implemented in mirror-image form in the section 3 of the steering shaft 4, and claws 15 of the section 3 engage in corresponding depressions 16a in the housing 2. The maximum rotary angle difference is therefore formed by the play between the interengaging claws 15, 17 and the corresponding depressions 16, 16a, that is to say by the width of the parting line 5 running longitudinally, which therefore acts as a rotary angle limiter 7.

For the purpose of further explanation, reference will now be made again to FIG. 1. The section 3 of the steering shaft 4 has a holder 8, in which a torsion rod 10 bearing a measuring cell 9 engages. The housing 2 is connected, by means of two dowel pins 11 located opposite each other, to a further section 12 of the steering shaft 4, steerable wheels (not illustrated here) of the motor vehicle being connected to the section 12. This section 12 is equipped with a form-fitting holder 13, in which the torsion rod 10 is fixed largely without stress. The two sections 3 and 12 are connected to each other by means of the torsion rod 10. The housing 2 has an opening 14 for an electrical contact means (not illustrated), which is connected to the measuring cell 9.

FIG. 2 shows the sensor 1 in a view sectioned along the line II—II. It is possible to see the two claws 17, which have been cut out of the housing 2 in the manner of a step and are shown in a sectional illustration, and the corresponding claws 15 of the section 3 of the steering shaft 4 which engage between these claws 17. For this purpose, the housing 2 has four parallel, longitudinally extending parting lines 5, whose width determines a limited rotary mobility of the housing 2 with respect to the section 3 of the steering shaft 4. It is also possible to see the parting lines 6 running transversely to the axis of rotation in the plane of the figure. The torsion rod 10 is inserted with a force fit into a holder 8 in the section 3, said holder being implemented as a drilled hole and therefore permitting the stress-free, in particular torsion-free, insertion of the torsion rod 10 at any rotary angle. The torsion rod 10 is subsequently fixed by filling the remaining free spaces with adhesive, a play-free connection being achieved.

FIG. 3 shows a partly sectioned illustration of the sensor 1 in a position rotated through 90°. It is possible to see the housing 2, which is separated from the section 3 of the steering shaft 4 along the parting lines 5 and 6 which run at right angles to each other and in the manner of a step. At its other end, the housing 2 is pushed onto the section 12 and fixed by means of the dowel pins 11. The housing 2 encloses the torsion rod 10 which bears the measuring cell 9 and which connects the two sections 3 and 12 to each other. The longitudinally running parting line 5 acts as a rotary angle limiter 7 in the event of excessively high rotary forces, so that forces going beyond this are transmitted directly from the section 3 to the section 12 by means of the housing 2. In this case, the width of the parting line 5 determines the maximum rotary angle difference between the measuring cell 9 and the housing 2, which were initially connected to form one structural unit. As a result, the tolerance values of the individual components have no significance for the parting line 5 which is only then made. The parting lines 6 running transversely have no influence on the rotary angle difference and may, for example, already have been made in advance on the section 3.

The sensor 1 is produced in the following way: in a first production step, the torsion rod 10 is pressed into the holder 8 in the section 3 of the steering shaft 4. Section 3 and torsion rod 10 thus form a solid unit. The torsion rod 10 is then pressed into the holder 13 in the section 12. Section 3 and, respectively, housing 2 and section 12 are in this case led into one another with play and initially fixed to one another with adhesive. The housing 2 is then pinned to the section 12 by means of the dowel pins 11. The adhesive bonding prevents stresses being produced during the pinning operation, for example as a result of bending or twisting in the torsion rod 10. In this state, the housing 2, forming a single component, is connected to the section 3, and the structural elements section 3, torsion rod 10 and section 12 form a rigid unit. In a last production step, the longitudinally running parting lines 5 and the transversely running parting lines 6 (if the latter have not already previously been made) are made in the section 3 with the aid of a laser or water jet, as a result of which the housing 2 remains connected only indirectly to the section 3 via the section 12 and the torsion rod 10. In this way, it is possible to set a very accurate dimension for the parting lines 5 and hence for a mechanical overload protection for the sensor 1 whilst excluding all assembly tolerances.

What is claimed is:

1. A method for producing a torque limiting housing (2) around a torsion rod (10) connecting two shaft sections (3,12) of an automotive steering shaft (4) comprising:
   (a) providing a first shaft section (3) having a first body portion defining a longitudinal cavity which extends inwardly from one end thereof;
   (b) providing a torsion rod (10);
   (c) securing a first end of the torsion rod (10) to first shaft section (3) within the longitudinal cavity;
   (d) securing the second end of the torsion rod to a second shaft section (12);
   (e) connecting the body portion of first shaft section (3) to second shaft section (12); and
   (f) physically separating the first body portion into two parts by removing material of preselected width therefrom along parting lines that limit the maximum torque impartable to torsion rod (10) by shaft section (3).

2. The method as defined in claim 1 wherein the parting lines extend substantially parallel to the axis of the first body portion.

3. The method as defined in claim 1 or 2 wherein the material is removed to form parting line (5) by a laser.

4. The method as defined in claim 1 or 2 wherein the material is removed to form parting line (5) by a water jet.

5. The method as defined in claim 2 wherein material is removed to form parting lines (6) that extend substantially transversely to the torque limiting parting lines (5) and connect therewith and form a claw-like connection (15,17) between the two parts of the first body section.

6. The method as defined in claim 1 wherein the second end of the torsion rod is first adhesively secured to the second shaft section and is thereafter mechanically attached to the second shaft section.

7. The method as defined in claim 6 wherein the mechanical attachment is a dowel pin.

8. The method as defined in claim 1 wherein a torque measuring cell is operatively attached to the torsion rod.

9. The method as defined in claim 7 wherein an opening (14) is provided in housing (2) for electrical connection to the measuring cell.

* * * * *